(12) United States Patent
Kang (10) Patent No.: US 7,542,415 B2
(45) Date of Patent: Jun. 2, 2009

(54) APPARATUS FOR PERFORMING A PACKET FLOW CONTROL AND METHOD OF PERFORMING THE PACKET FLOW CONTROL

(75) Inventor: Young-Gyu Kang, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 895 days.

(21) Appl. No.: 10/879,525

(22) Filed: Jun. 30, 2004

(65) Prior Publication Data
US 2005/0030899 A1 Feb. 10, 2005

(30) Foreign Application Priority Data
Jun. 30, 2003 (KR) ...................... 10-2003-0043877

(51) Int. Cl.
G01R 31/08 (2006.01)
(52) U.S. Cl. ....................................... 370/229; 370/412
(58) Field of Classification Search ................. 370/229, 370/230, 235, 412
See application file for complete search history.

(56) References Cited

U.S. PATENT DOCUMENTS 6,993,050 B2 * 1/2006 Desai et al. .................. 370/536
2002/0176357 A1 * 11/2002 Lay ............................. 370/229

* cited by examiner

Primary Examiner—Kevin C Harper
Assistant Examiner—Wanda Z Russell
(74) Attorney, Agent, or Firm—Volentine & Whitt, P.L.L.C.

(57) ABSTRACT

Packet flow control is performed in a device having a packet memory, where the device is for connecting to a plurality of remote devices. Port interface devices transmit packets to and receive packets from the remote devices, respectively. Port controllers generate a packet flow control request signal that is active when the packet memory is in an overflow condition and generate a packet transmission request signal that is active when a packet stored in the packet memory is to be transmitted to at least one of the remote devices. Media access control (MAC) devices execute a packet flow control operation when the packet flow control request signal generated by the port controllers is active. The packet flow control operation includes transmitting a given bit stream to the remote devices via the respective port interface devices, and aborting the transmission of the given bit stream and transmitting a packet from the packet memory when the packet transmission request signal becomes active while the packet flow control request signal is active.

35 Claims, 12 Drawing Sheets

APPARATUS FOR PERFORMING A PACKET FLOW CONTROL AND METHOD OF PERFORMING THE PACKET FLOW CONTROL

BACKGROUND OF THE INVENTION

1. Field of the Invention

The present invention relates to an apparatus for performing a packet flow control and a method of performing the packet flow control. More particularly, the present invention relates to an apparatus for performing a packet flow control and a method of performing the packet flow control wherein packets may be transmitted during a back pressure operation.

A claim of priority is made to Korean Patent Application No. 2003-43877 filed on Jun. 30, 2003, the contents of which are herein incorporated by reference in its entirety.

2. Description of the Related Art

In data communications networks, devices that communicate with each other on a given network link may be configured for either half duplex or full duplex communication. In full duplex communication, the devices can simultaneously transmit data to one another across the link. On the other hand, in half duplex communication, only one device at a time may transmit data, and accordingly, the devices take turns transmitting data to each other. An Ethernet, in which data is transmitted in the form of packets, is an example of a system which may employ half duplex communication.

In half duplex mode, a problem can arise if the packet memory of a receiving device is filled to capacity. If this occurs, newly transmitted packets from a remote device to the receiving device may be lost. Accordingly, half duplex systems typically include a packet flow control mechanism to prevent overflow of packet memories. For example, an Ethernet switch operating in a half-duplex mode adopts a so-called back pressure flow control as a form of packet flow control. Back pressure flow control is generally characterized as either collision type or carrier type.

According to the collision type of back pressure flow control, in the case where an overflow condition in the packet memory of the receiving device is detected, the receiving device transmits a jamming signal (jamming packets) towards the remote device so as to intentionally create a collision on the link which can be detected by the remote device. The remote device then waits a predetermined period of time prior to transmitting further packets. Occasionally, however, the remote device may not sense the collision until after a predetermined initial period of time from the initiation of a transmission on the network link. Normally collisions occur during an interval of a minimum-size message of 64 bytes. Collisions which are sensed after 64 bytes have been transmitted are late collisions which can cause an error condition.

According to the carrier type of back pressure flow control, in the case where an overflow condition in the packet memory of the receiving device is detected, a bit stream is transmitted to the remote device during a period in which no packets are being transmitted. The bit stream informs the remote device to hold off on the transmission of further packets. However, a collision may occur at the beginning of the back pressure operation, and as result the bit stream may not be transmitted to the remote device. In addition, the remote device may discard packet(s) due to excessive latency error when the time period of the back pressure operation becomes longer.

SUMMARY OF THE INVENTION

It is a first feature of the present invention to provide an apparatus for performing a packet flow control in which packets may be transmitted during a back pressure operation and an effective packet flow control may be performed.

It is a second feature of the present invention to provide a method of performing the packet flow control in which packets may be transmitted during a back pressure operation and an effective packet flow control may be performed.

In one aspect of the present invention, there is provided an apparatus for performing a packet flow control. The apparatus includes a plurality of port controllers, a plurality of port interface devices and a plurality of media access control (MAC) devices. The port controllers generate a packet flow control request signal when packet memory status information represents that a packet memory is in an overflow condition. The port interface devices receive first packets from a plurality of ports to convert the first packets to a digital signal or an analog signal. The media access control (MAC) devices perform the packet flow control when the MAC devices receive the packet flow control request signal from the port controllers. The MAC devices generate a predetermined bit stream in response to the packet flow control request signal, transmit the predetermined bit stream to respective ports before an inter-packet gap (IPG) time is finished while the packet flow control request signal is active, and stop transmitting the predetermined bit stream to transmit a second packet when a packet transmission request signal is activated and the packet flow control request signal is active. For example, the packet flow control is a back pressure flow control. The MAC devices may perform the back pressure flow control when the ports via which the first packets are received and transmitted are in an idle status. The MAC devices may transmit the predetermined bit stream when the packet flow control request signal is activated and the packet transmission request signal is not activated. The MAC devices may transmit the predetermined bit stream after waiting a predetermined time period from a first instance when the MAC devices detect the idle status to a second instance when a time period corresponding to a 64-bits length is finished. The MAC devices may stop transmitting the predetermined bit stream when a time period during which the MAC devices transmit the predetermined bit stream is longer than an excessive latency time, and may retransmit the predetermined bit stream after waiting the inter-packet gap (IPG) time. The MAC devices may stop transmitting the predetermined bit stream and may transmit the second packet when the MAC devices receive the packet transmission request signal from the port controllers while the MAC devices transmit the predetermined bit stream during the back pressure control. The MAC devices may transmit the second packet after waiting a predetermined time period from a first instance when the MAC devices detect the idle status to a second instance when a time period corresponding to a 64-bits length is finished when the MAC devices receive the packet transmission request signal from the port controllers and the packet flow control request signal is active. The MAC devices may retransmit after waiting a predetermined time period when each of the MAC devices detect the packet collision. Each of the MAC devices may include a bit stream module for generating the bit stream to provide the ports with the bit stream, a port status detecting module for detecting whether the ports are in an idle status, and a packet transmitting module for transmitting the second packet when the packet transmitting module receives the packet transmission request signal from the port controllers.

In anther aspect of the present invention, there is provided a method of performing a packet flow control. First, a packet memory status information, which represents whether the packet memory is in an overflow condition, is generated. A packet flow control request signal is generated when the packet memory status information represents that the packet memory is in the overflow condition. The packet flow control is performed when the packet flow control request signal is activated. A predetermined bit stream is generated when the packet flow control request signal is activated. The predetermined bit stream is transmitted before an inter-packet gap (IPG) time is finished while the packet flow control request signal is active. A first packet is transmitted when a packet transmission request signal that requests transmission of the first packet is activated while the packet flow control request signal is active. The transmission of the predetermined bit stream is stopped during transmission of the first packet. For example, the bit stream includes a preamble. The back pressure flow control may be performed when the port is in an idle status. The predetermined bit stream may be generated when the packet flow control request signal is activated and the packet transmission request signal is not activated. The predetermined bit stream may be transmitted from a first instance when the idle status of the ports is detected to a second instance when the time period corresponding to a 64-bits length is finished when the packet flow control request signal is active and a port through which the bit stream is transmitted is in an idle status. The transmission of the predetermined bit stream may be stopped when a time period during which the predetermined bit stream is transmitted is longer than an excessive latency time, and the predetermined bit stream may be retransmitted after waiting the inter-packet gap (IPG) time. The transmission of the predetermined bit stream may be stopped and the first packet may be transmitted when the packet transmission request signal is activated while the predetermined bit stream is transmitted. The first packet may be transmitted in response to the packet transmission request signal from a first instance when the idle status of the ports is detected to a second instance when the time period corresponding to a 64-bits length is finished when the packet flow control request signal is active. The first packet may be transmitted before a time period corresponding to a 96-bits length is finished in response to the packet transmission request signal when the packet flow control request signal is inactive and the port is in the idle status. The transmission of the predetermined bit stream may be stopped when the packet collision occurs at the at least one port while the predetermined bit stream is transmitted, and the predetermined bit stream may be retransmitted in a predetermined period. The predetermined period may be from a first instance when the idle status of the ports is detected to a second instance when the time period corresponding to a 64-bits length is finished.

According to present invention, the bit stream is transmitted after waiting a predetermined time period, which is from the instance when the idle status of the ports is detected to the instance when, for example, 64-bits time is finished, during the back pressure flow control operation. Therefore, the back pressure flow control operation may be effectively performed.

In addition, when a packet transmission is requested during the transmission of the bit stream, the requested packet is transmitted instead of the bit stream. Therefore, the back pressure flow control operation according to the present invention allows for effective management of the packet memory.

BRIEF DESCRIPTION OF THE DRAWINGS

The features of the present invention will become more readily apparent from the detailed description that follows, with reference to the accompanying drawings, in which.

DETAILED DESCRIPTION OF THE PREFERRED EMBODIMENTS

Hereinafter the exemplary embodiments of the present invention will be described in detail with reference to the accompanying drawings.

Figure 1:
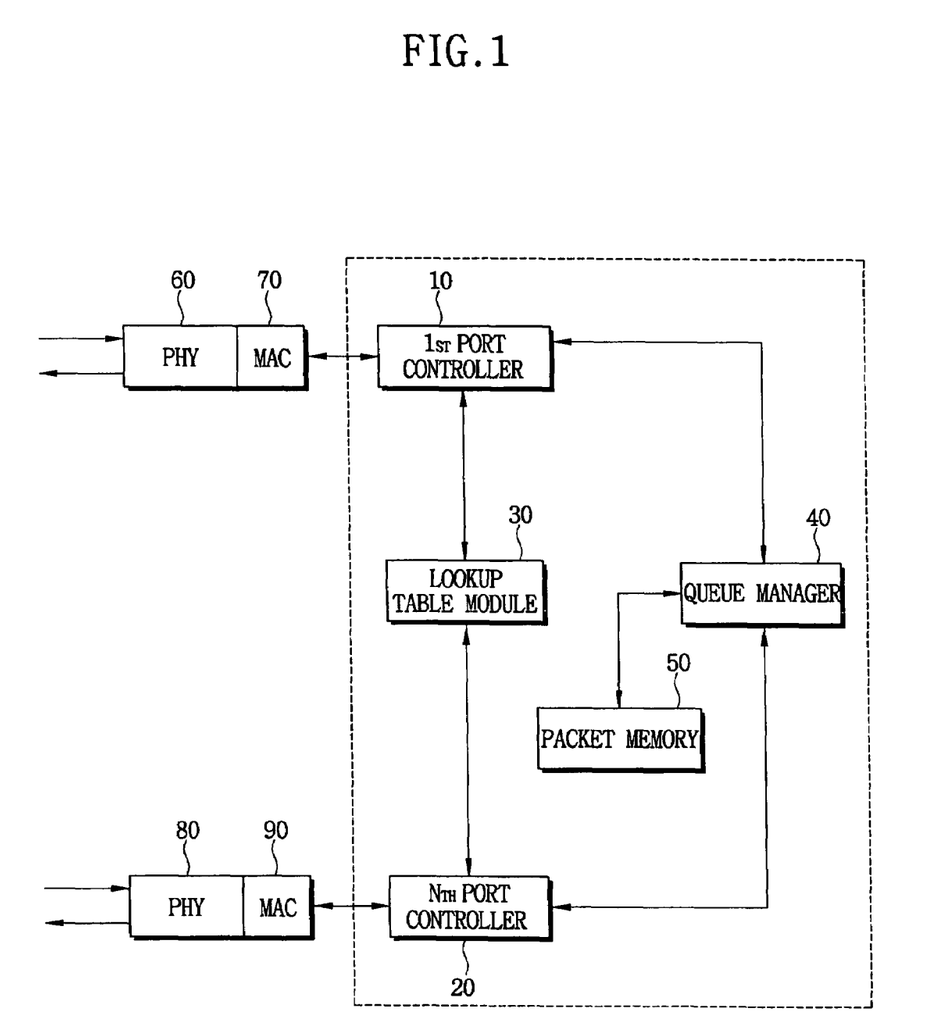
FIG. 1 is a schematic view showing an apparatus for performing a packet flow control according to an embodiment of the present invention.

FIG. 1 is a schematic block diagram showing an apparatus for performing a packet flow control according to an embodiment of the present invention.

Referring to FIG. 1, the apparatus includes a plurality of port controllers 10 and 20, a lookup table module 30, a queue manager 40, a packet memory 50, a plurality of port interface devices 60 and 80, and a plurality of media access control (MAC) devices 70 and 90. For example, the apparatus may be an Ethernet switch.

The port controllers 10 and 20 receive and transmit packets, provide information for the lookup table 30, receive packet memory status information and packet transmission information, and generate a packet flow control request signal when the packet memory status information indicates that the packet memory 50 is in an overflow condition.

The lookup table module 30 receives data of the packets from the port controllers 10 and 20 to configure a lookup table that contains lookup table information including a source address, a destination address and a MAC address for each of the packets. In addition, the lookup table module 30 provides the lookup table information to the port controllers 10 and 20.

The packet memory 50 stores the packets provided from the port controllers 10 and 20. In particular, the packet memory 50 stores the packets in different locations of the packet memory 50 corresponding to a plurality of ports. In other words, the packet memory 50 stores the packets of each port in a different location of the packet memory 50.

The queue manager 40 monitors a status of the packet memory 50 to determine whether the packet memory 50 is in an overflow condition, and generates packet memory status information indicative of the overflow condition. In addition, the queue manager 40 receives the lookup table information from the port controllers 10 and 20 to generate packet transmission information based on the lookup table information. The packet transmission information includes the source address, the destination address and the MAC address of the packets that are supposed to be transmitted. The queue manager 40 stores the packet transmission information in different locations of the packet memory 50 corresponding to the ports, and provides the packet transmission information and the packet memory status information to the port controllers 10 and 20.

The port controllers 10 and 20 write packets supplied from a first port into a location of the packet memory 50 subject to the packet memory status information supplied from the queue manager 40. The port controllers 10 and 20 read packets from the packet memory 50 using the packet transmission information. The port controllers 10 and 20 provide a second port with the read packets. The port controllers 10 and 20 generate the packet flow control request signal when the packet memory status information indicates that the packet memory 50 is an overflow condition. In other words, the port controllers 10 and 20 generate the packet flow control request signal when the quantity of the packets stored in the packet memory 50 is larger than a threshold value. In particular, the queue manager 40 monitors the status of the packet memory 50 to detect whether the quantity of the packets stored in the packet memory 50 is larger than the threshold value. The queue manager 40 provides the port controllers 10 and 20 with an overflow signal when the quantity of the packets stored in the packet memory 50 is larger than the threshold value. Consequently, the port controllers 10 and 20 generate the packet flow control request signal so as to stop transmitting packets. The port controllers 10 and 20 stop transmitting packets until the quantity of the packets stored in the packet memory 50 is less than the threshold value.

The port interface devices 60 and 80 (physical layer PHY) receive packets from respective ports to convert the packets to a digital signal or an analog signal, and detect whether a packet collision has occurred. In particular, for example, the port interface devices 60 and 80 convert the analog packets received from a remote device into digital packets, and convert digital packets received from the MAC devices 70 and 90 to analog packets for transmission to the remote devices. The port interface devices 60 and 80 monitor the status of respective ports to determine whether a packet collision has occurred.

The MAC devices 70 and 90 receive the packet flow control request signal from the port controllers 10 and 20 to perform packet flow control. In particular, for example, the MAC devices 70 and 90 detect whether a corresponding remote-side port is in an idle status when the MAC devices 70 and 90 receive the packet flow control request signal from the port controllers 10 and 20. The MAC devices 70 and 90 generate a predetermined bit stream to transmit the bit stream to the first port when the first port is in the idle status. The MAC devices 70 and 90 stop transmitting the predetermined bit stream and transmit a packet when a packet transmission request signal is received from the port controllers 10 and 20. For example, the bit stream may include a preamble. The preamble contains no data but comprises dummy bits.

Thus, the remote device is able to differentiate the bit stream from ordinary data packets to recognize the bit stream as a control signal for the packet flow control.

For example, the packet flow control may adopt a back pressure flow control. The apparatus transmits the bit stream to the corresponding port by means of the back pressure flow control. The apparatus stops transmitting the bit stream and transmits a packet when the packet transmission request signal for requesting for transmitting the packet is active. Therefore, the apparatus effectively performs the packet flow control.

Figure 2:
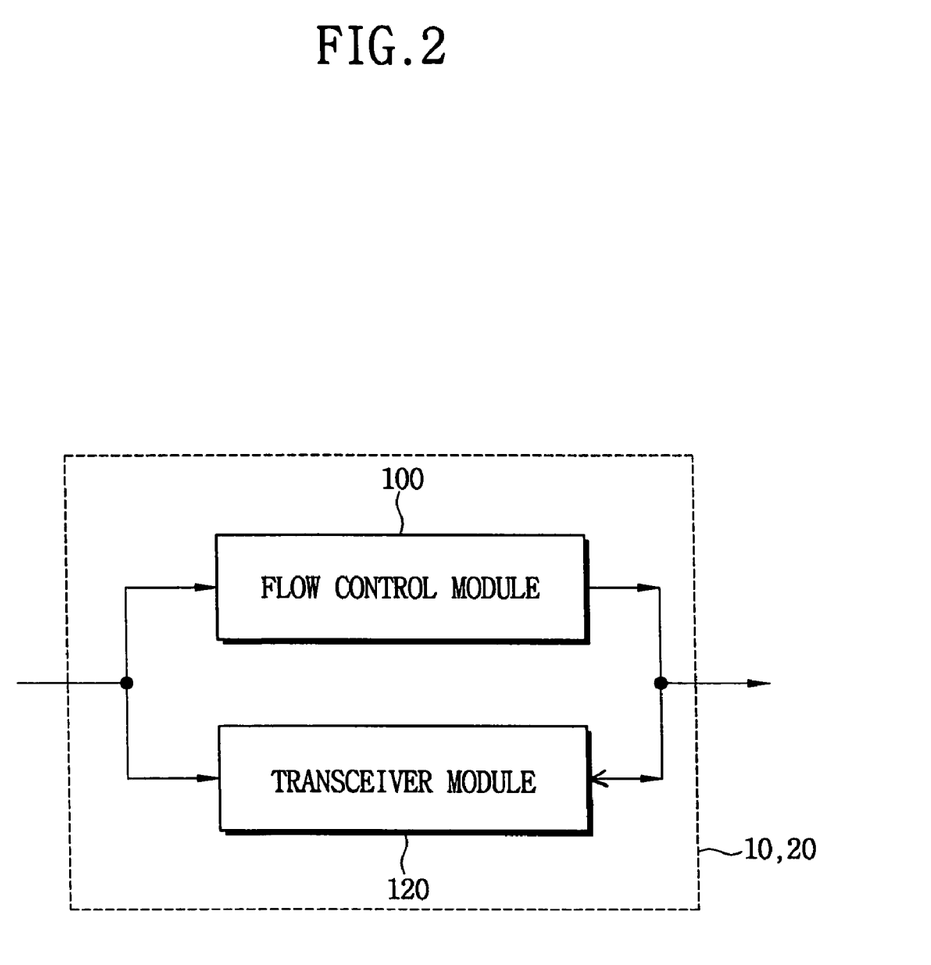
FIG. 2 is a schematic view showing an exemplary port controller of FIG. 1.

FIG. 2 is a schematic view showing an exemplary port controller of FIG. 1.

Referring to FIG. 2, the port controllers 10 and 20 may each include a flow control module 100 and a transceiver module 120. A first port 201 of the port controllers 10 and 20 is operatively coupled to the MAC devices 70 and 90 (FIG. 1), respectively, and a second port 202 is operatively coupled to the queue manager 40 (FIG. 1).

The flow control module 100 provides the MAC devices 70 and 90 with the packet flow control request signal when the queue manager 40 indicates that the quantity of the packets stored in the packet memory 50 is larger than a threshold value.

The transceiver 120 transmits the packets received on the first port 201 via the corresponding MAC device to the packet memory 50 and the lookup table module 40, and transmits the packets received on the second port 202 from the packet memory 50 to the corresponding MAC device. In addition, the transceiver 120 transmits the lookup table information to the queue manager 40, and receives the packet memory status information and the packet transmission information from the queue manager 40.

Figure 3:
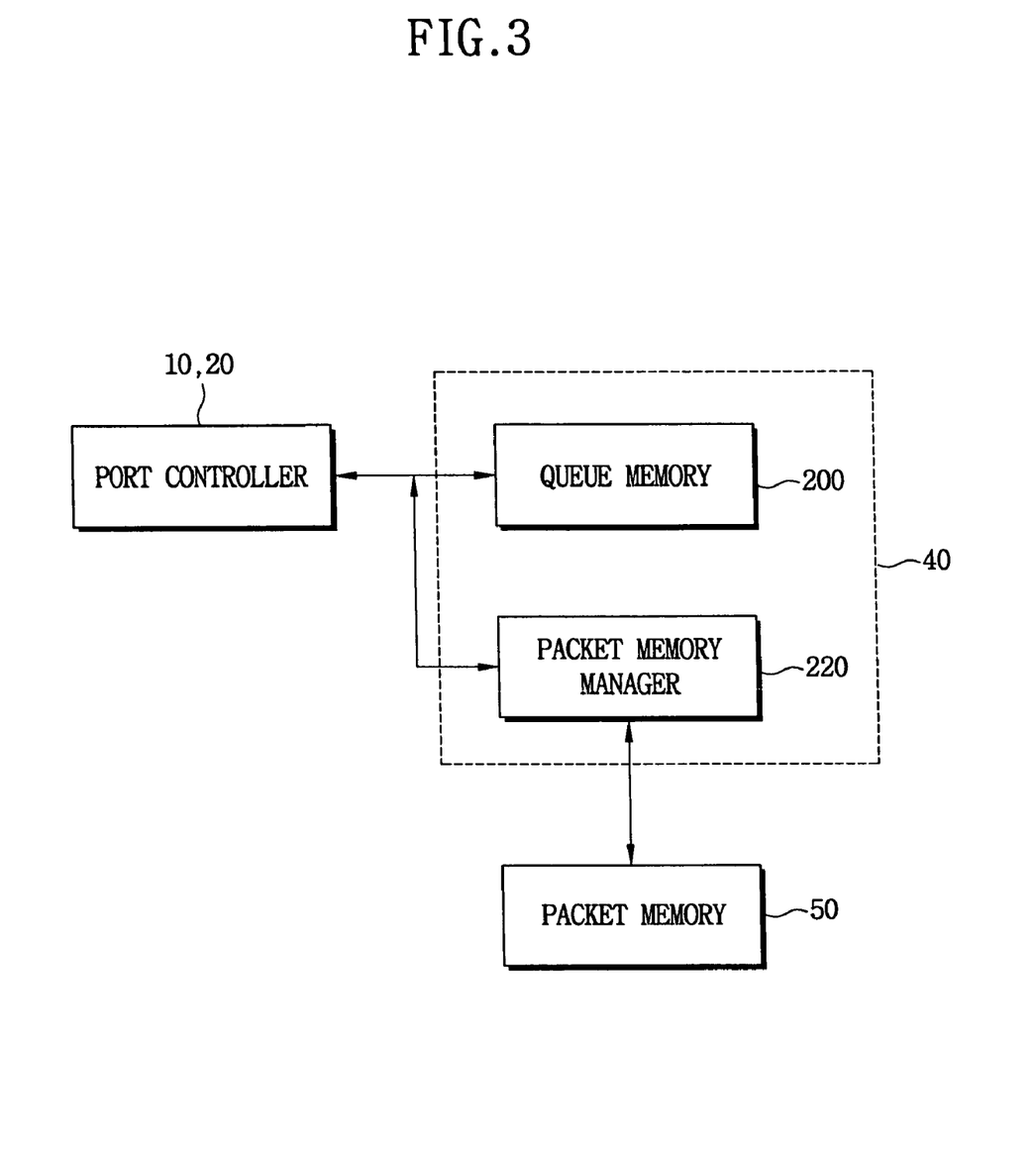
FIG. 3 is a schematic view showing an exemplary queue manager of FIG. 1.

FIG. 3 is a schematic view showing an exemplary queue manager of FIG. 1.

Referring to FIG. 3, the queue manager 40 includes a queue memory 200 and a packet memory manager 220.

The queue memory 200 generates the packet transmission information using the lookup table information. The queue memory 200 stores packet transmission information regarding the packets to be transmitted to the corresponding port. For example, the queue memory 200 stores packet transmission information regarding the packets in different spaces of the queue memory according to the ports via which the packets are transmitted. Particularly, in case the packets received from first, third and fourth ports are supposed to be transmitted to the second port, the queue memory 200 stores packet transmission information about the packets received from the first, third and fourth ports in the space assigned to the second port, and provides the packet transmission information regarding the packets received from the first, third and fourth ports to a second port controller. Thus, the packets received from first, third and fourth ports are in order transmitted to the second port.

The packet memory manager 220 monitors the status of the packet memory 50. In particular, the packet memory manager 220 monitors whether the packet memory is in an overflow condition and monitors the information regarding the packets stored in the packet memory 50. The packet memory manager 220 provides the port controllers 10 and 20 with the results of the monitoring operation.

Figure 4:
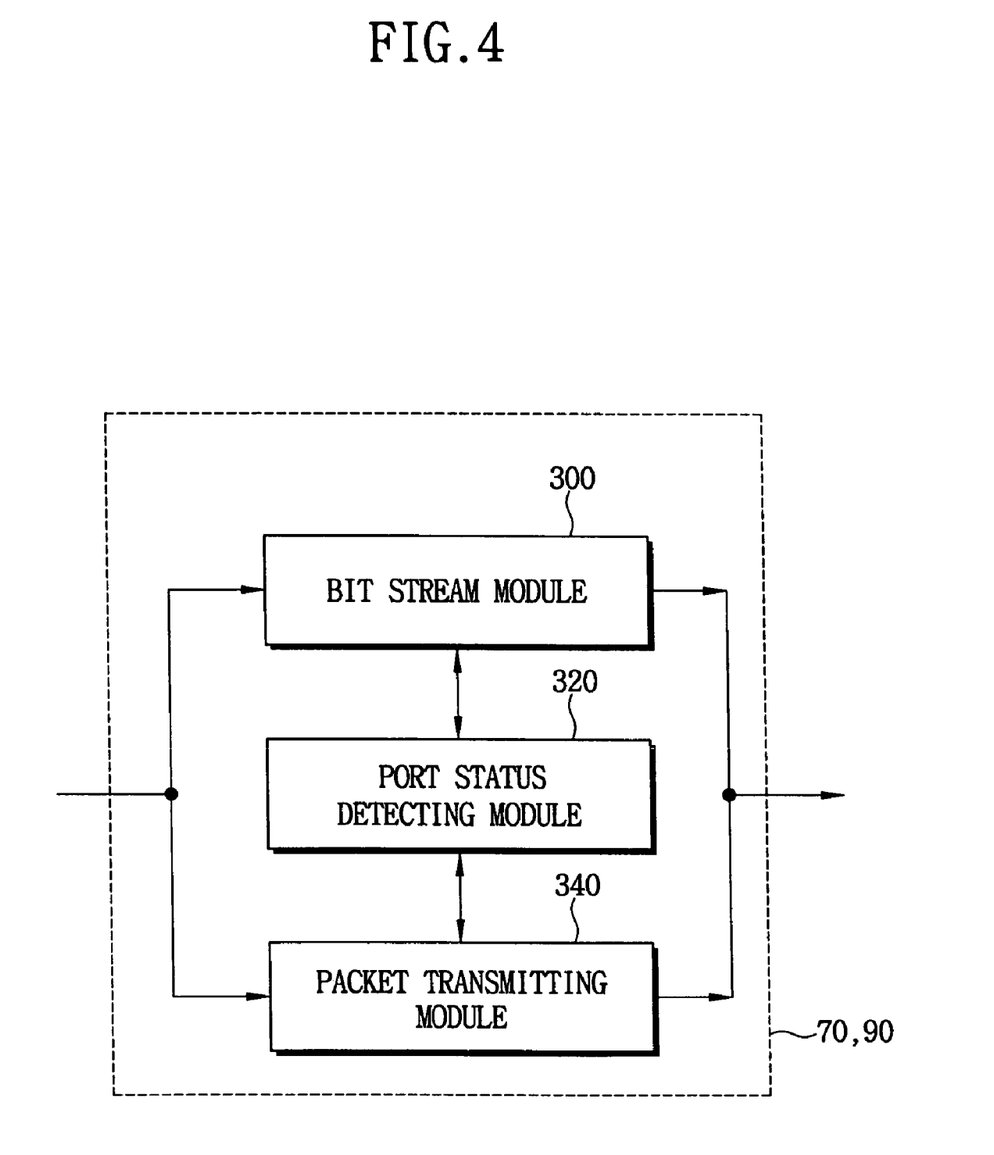
FIG. 4 is a schematic view showing an exemplary MAC device of FIG. 1.

FIG. 4 is a schematic block diagram showing an exemplary MAC device of FIG. 1.

Referring to FIG. 4, the MAC devices 70 and 90 may each include a bit stream module 300, a port status detecting module 320 and a packet transmitting module 340. The MAC devices 70 and 90 are coupled to the port controllers, respectively.

In response to the packet flow control request signal from the port controllers 10 and 20, the bit stream module 300 generates the bit stream to provide the corresponding port with the bit stream when the bit stream module 300 receives the packet flow control request signal from the port controllers 10 and 20. In particular, in case the bit stream module 300 receives the packet flow control request signal from the port controllers 10 and 20 and the ports are in the idle status, the bit stream module 300 generates the bit stream, and transmits the bit stream after waiting a predetermined time period to the ports. For example, the predetermined time period is from the instance when the idle status of the ports is detected to the instance when a 64-bits time is finished. Hereinafter, the n-bits time is referred to as a time period corresponding to an n-bits length.

The port status detecting module 320 detects whether the ports are in the idle status.

The packet transmitting module 340 transmits a packet to the corresponding port when the ports is in the idle status and the packet transmitting module 340 receives a packet transmission request signal, which requests sending of the packet, from the port controllers 10 and 20. In particular, the packet transmitting module 340 transmits the packet to the corresponding port after waiting an IPG (inter-packet gap) time when the packet transmitting module 340 receives the packet transmission request signal before the back pressure operation begins. The packet transmitting module 340 transmits the packet to the corresponding port after waiting the predetermined time period from the instance when the idle status is detected to the instance when the 64-bits time is finished when the packet transmitting module 340 receives the packet transmission request signal after the back pressure operation begins.

Figure 5:
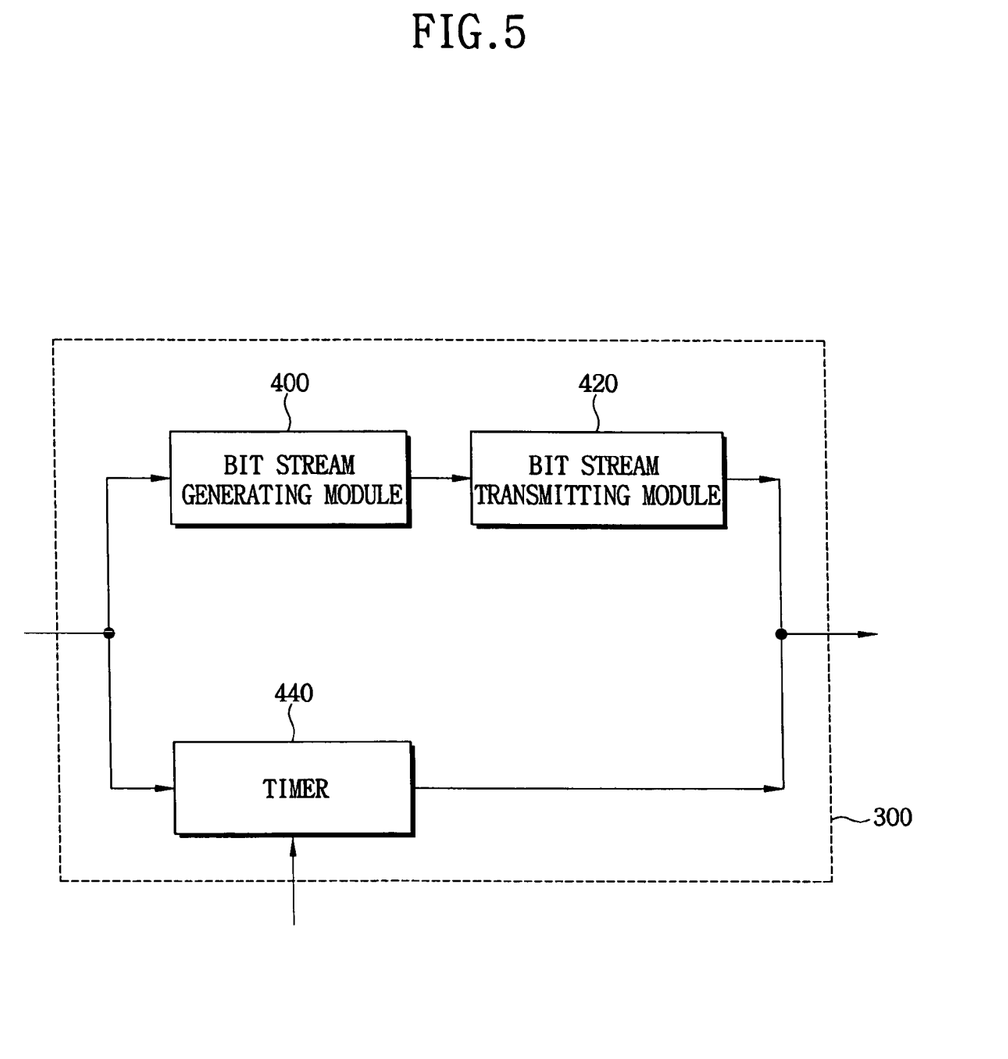
FIG. 5 is a schematic view showing an exemplary bit stream module of FIG. 4.

FIG. 5 is a schematic view showing an exemplary bit stream module of FIG. 4.

Referring to FIG. 5, the bit stream module includes a bit stream generating module 400, a bit stream transmitting module 420 and a timer 440.

The bit stream generating module 400 generates the bit stream in response to the packet flow control request signal.

The bit stream transmitting module 420 transmits the bit stream to the corresponding port.

The timer 440 measures bit(s) time after the idle status is detected.

Figure 6:
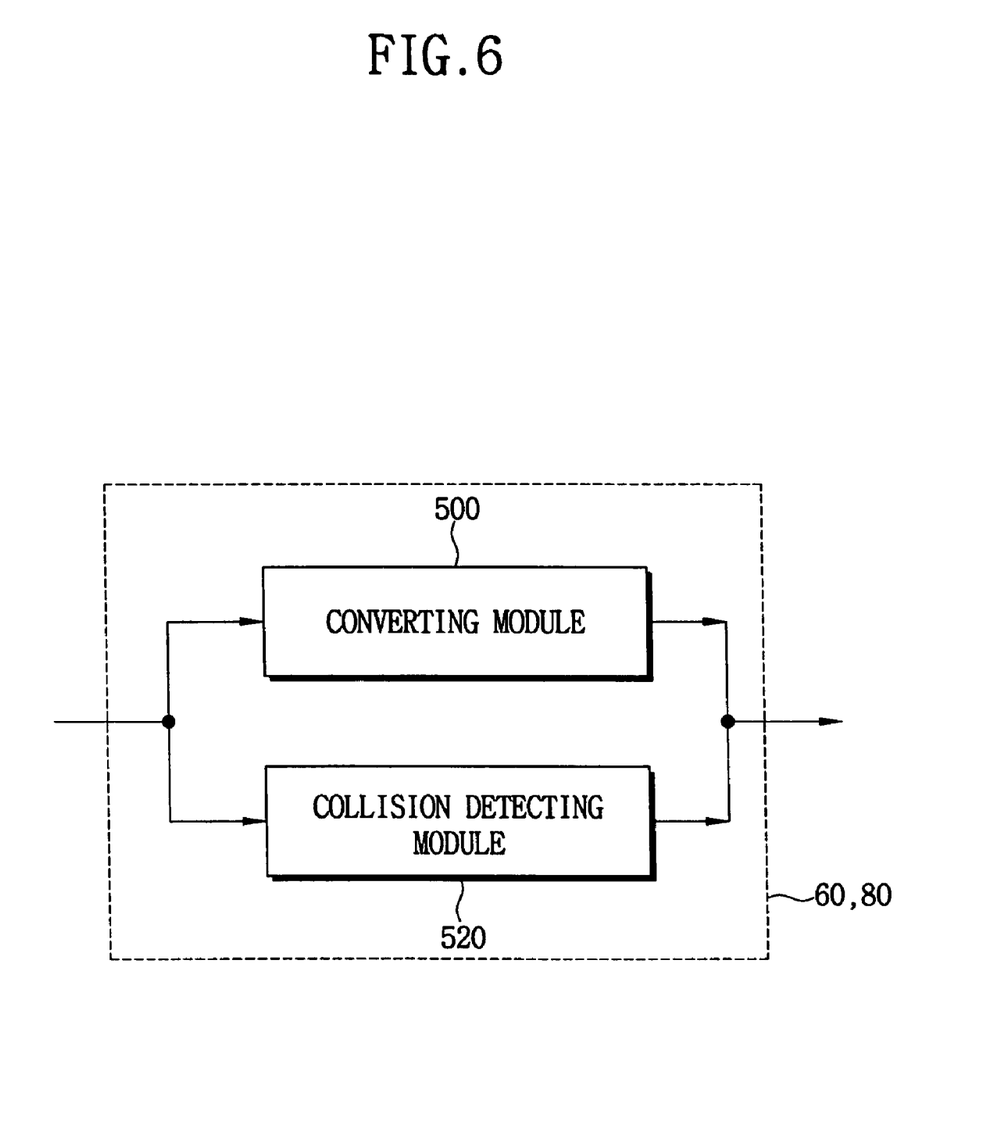
FIG. 6 is a schematic view showing an exemplary port interface device of FIG. 1.

FIG. 6 is a schematic block diagram showing an exemplary port interface device of FIG. 1.

Referring to FIG. 6, the port interface devices 60, 80 respectively include a converting module 500 and a collision detecting module 520.

The converting module 500 converts analog signal packets received from a remote device via a first port into digital signal packets, and outputs the digital signal packets to a second port. Conversely, the converting module 500 converts digital signal packets received on the second port to analog signal packets and outputs the analog signal packets to the remote device.

The collision detecting module 520 monitors the first port to determine whether a packet collision occurs at a corresponding port when the bit stream or the packets are transmitted to the corresponding port.

Figure 7:
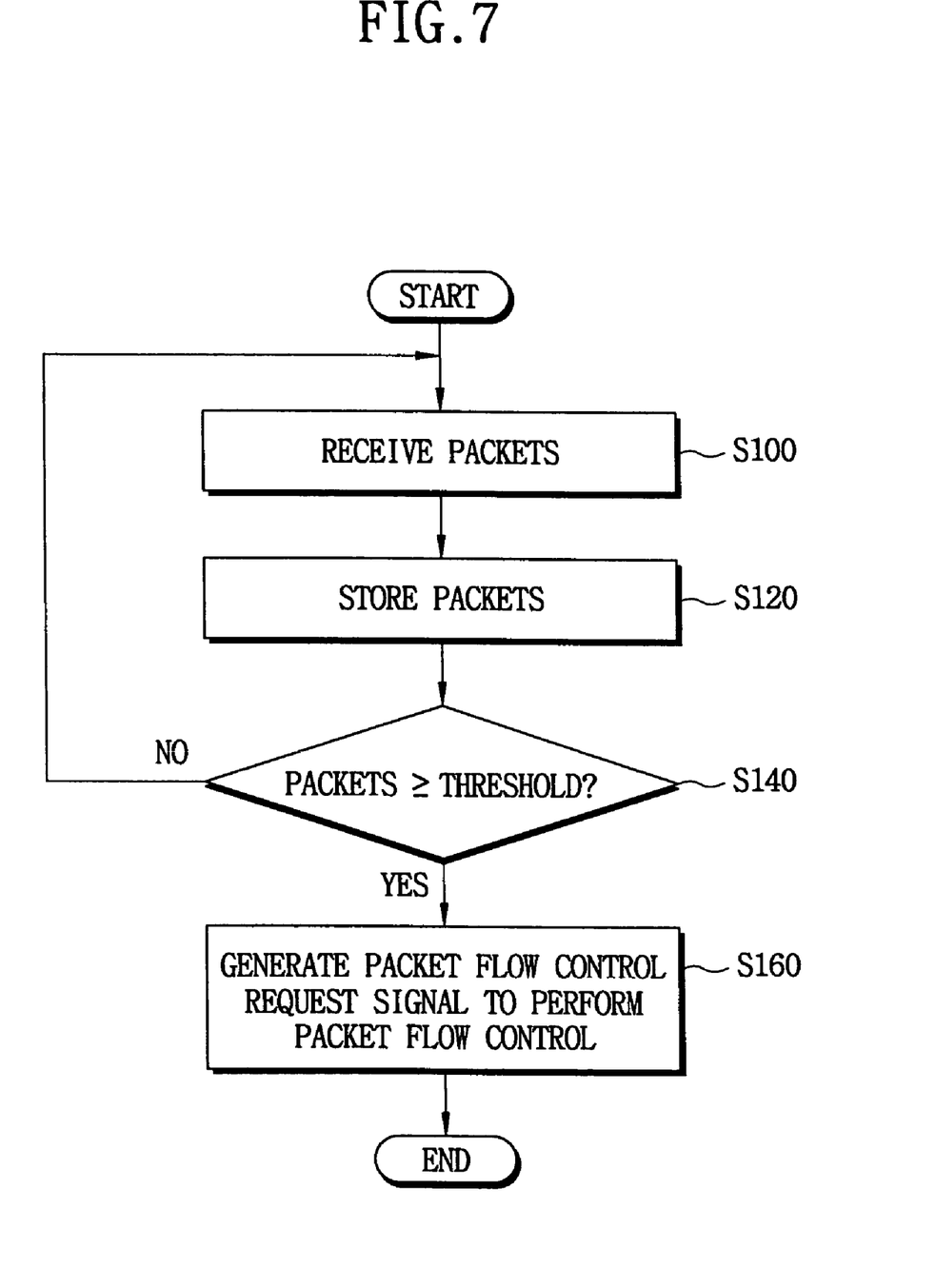
FIG. 7 is a flow chart showing a packet flow control method according to an embodiment of the present invention.

FIG. 7 is a flow chart showing a packet flow control method according to the present invention.

Referring to FIG. 7, packets that are supposed to be transmitted to a port are received from another port(s) (step S100).

The packets respectively have a source address and a destination address. The received packets are provided to the lookup table module 30, and are written in the packet memory 50 to be stored in the packet memory 50 (step S120). The quantity of the packets stored in the packet memory 50 is compared with a threshold value (step S140). When the quantity of the packets stored in the packet memory 50 is larger than the threshold value, the port controllers 10 and 20 stop receiving packets and generate the packet flow control request signal so as to perform the packet flow control (step S160). When the quantity of the packets stored in the packet memory 50 is smaller than the threshold value, the packets received from ports are stored in the packet memory 50.

Figure 8:
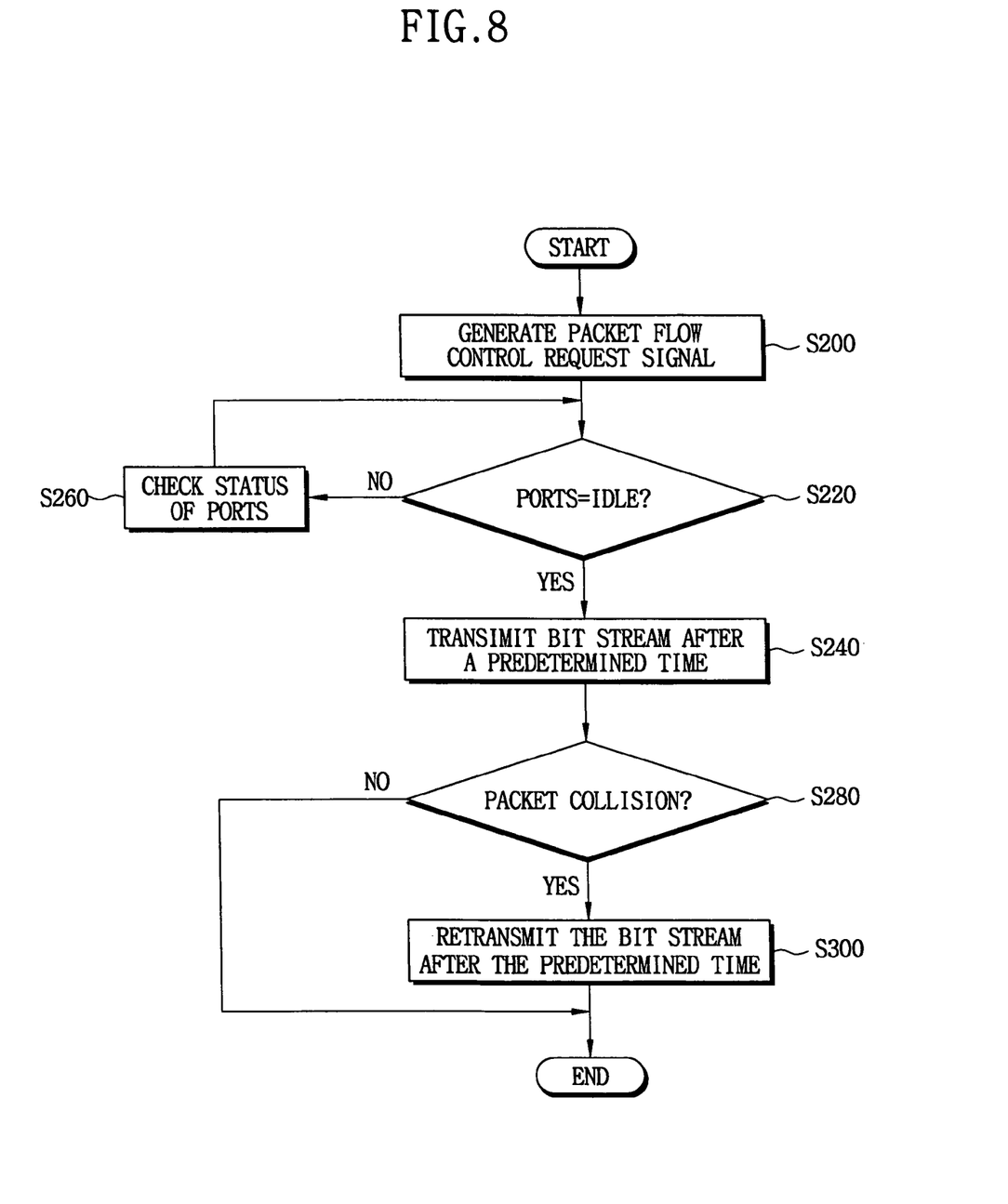
FIG. 8 is a flow chart showing a back pressure flow control according to an embodiment of the present invention.

FIG. 8 is a flow chart showing a back pressure flow control of according to a first exemplary embodiment of the present invention.

Referring to FIG. 8, when the quantity of the packets stored in the packet memory 50 is larger than the threshold value, the port controllers 10 and 20 stop receiving packets and generate the packet flow control request signal (step S200).

The MAC devices 70 and 90 check whether the ports to which the packets are transmitted are in the idle status when the MAC devices 70 and 90 receive the packet flow control request signal (step S220).

When the ports are not in the idle status, the MAC devices 70 and 90 check the status of the ports continuously (step S260).

When the ports are in the idle status, the MAC devices 70 and 90 generate the bit stream and transmit the bit stream after waiting a predetermined time period (step S240). For example, the predetermined time period may be from the instance when the idle status of the ports is detected to the instance when 64-bits time is finished. For example, the bit stream includes a preamble. The preamble contains no data but comprises dummy bits. The bit stream does not include a SFD (start frame delimiter). Therefore, the remote device is able to differentiate the bit stream from ordinary data packets to recognize the bit stream as a control signal for the packet flow control. Generally, the bit stream is transmitted after waiting the IPG time. The IPG time corresponds to 96bits time, or a time period corresponding to at least 96-bits length. The IPG time is 9.6 .mu.s in 10Mbps, and 0.96 .mu.s in 100 Mbps. The IPG time is divided into two parts, where a first part corresponds to 64-bits time and a second part corresponds to a 32 bit time. For example, the bit stream is transmitted from the instance when the idle status of the ports is detected to the instance when 64-bits time is finished. In other words, the bit stream is transmitted before 64-bits time is finished after the idle status is detected. Therefore, the back pressure operation begins before the remote device begins to transmit a packet, and the packet is effectively prevented from transmitting from the remote device.

In step S280, it is checked whether packet collision between the packet transmitted from the remote device and the bit stream occurs. When the packet collision occurs, the MAC devices 70 and 90 retransmit the bit stream after waiting the predetermined time period. Therefore, the MAC devices 70 and 90 are able to retransmit the bit stream before the remote device transmits a packet, and the remote device is not able to transmit the packet while the bit stream is transmitted. When the packet collision does not occur, the bit stream is transmitted to the remote device.

Figure 9:
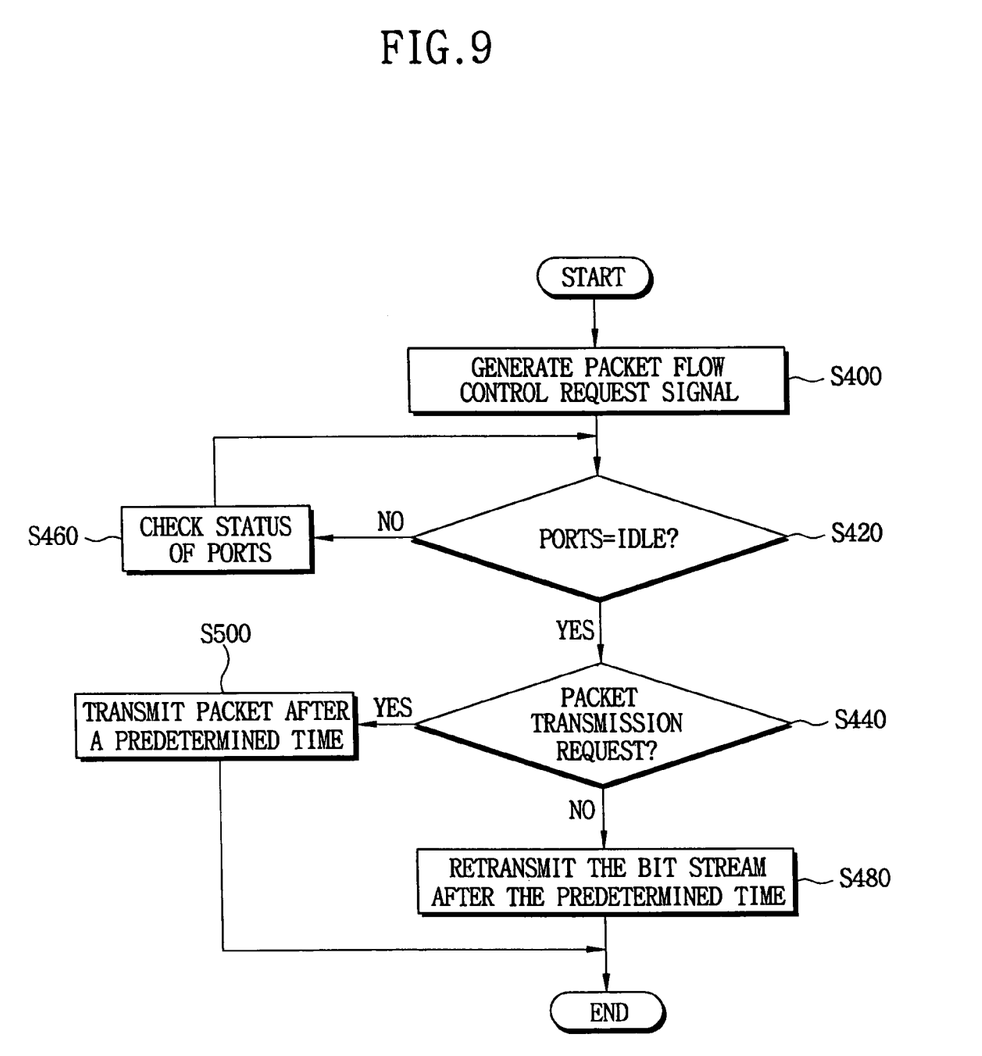
FIG. 9 is a flow chart showing a back pressure flow control according to another embodiment of the present invention.

FIG. 9 is a flow chart showing a back pressure flow control of according to a second exemplary embodiment of the present invention.

Referring to FIG. 9, when the quantity of the packets stored in the packet memory 50 is larger than the threshold value, the port controllers 10 and 20 generate the packet flow control request signal (step S400).

The MAC devices 70 and 90 check whether the ports to which the packets are transmitted are in the idle status when the MAC devices 70 and 90 receive the packet flow control request signal (step S420).

When the ports are not in the idle status, the MAC devices 70 and 90 check the status of the ports continuously (step S460).

When the ports are in the idle status, the MAC devices 70 and 90 perform the back pressure flow control. The MAC devices 70 and 90 check whether packet transmission request signal is received before transmitting the bit stream during the back pressure flow control (step S440).

When the MAC devices 70 and 90 receive the packet transmission request signal, the MAC devices 70 and 90 stop transmitting the bit stream and transmit the requested packet after waiting a predetermined time period (step S500).

However, when the MAC devices 70 and 90 do not receive the packet transmission request signal, the MAC devices 70 and 90 generate the bit stream and transmit the bit stream after waiting the predetermined time period (step S480). For example, the predetermined time period may be from the instance when the idle status of the ports is detected to the instance when 64-bits time is finished. The requested packet is transmitted instead of the bit stream when the packet transmission request signal is received during the back pressure operation. Thus, the packet memory may have spare space corresponding to the transmitted packet, and the generation of the bit stream is unnecessary. Therefore, the back pressure flow control may be performed more effectively.

Figure 10:
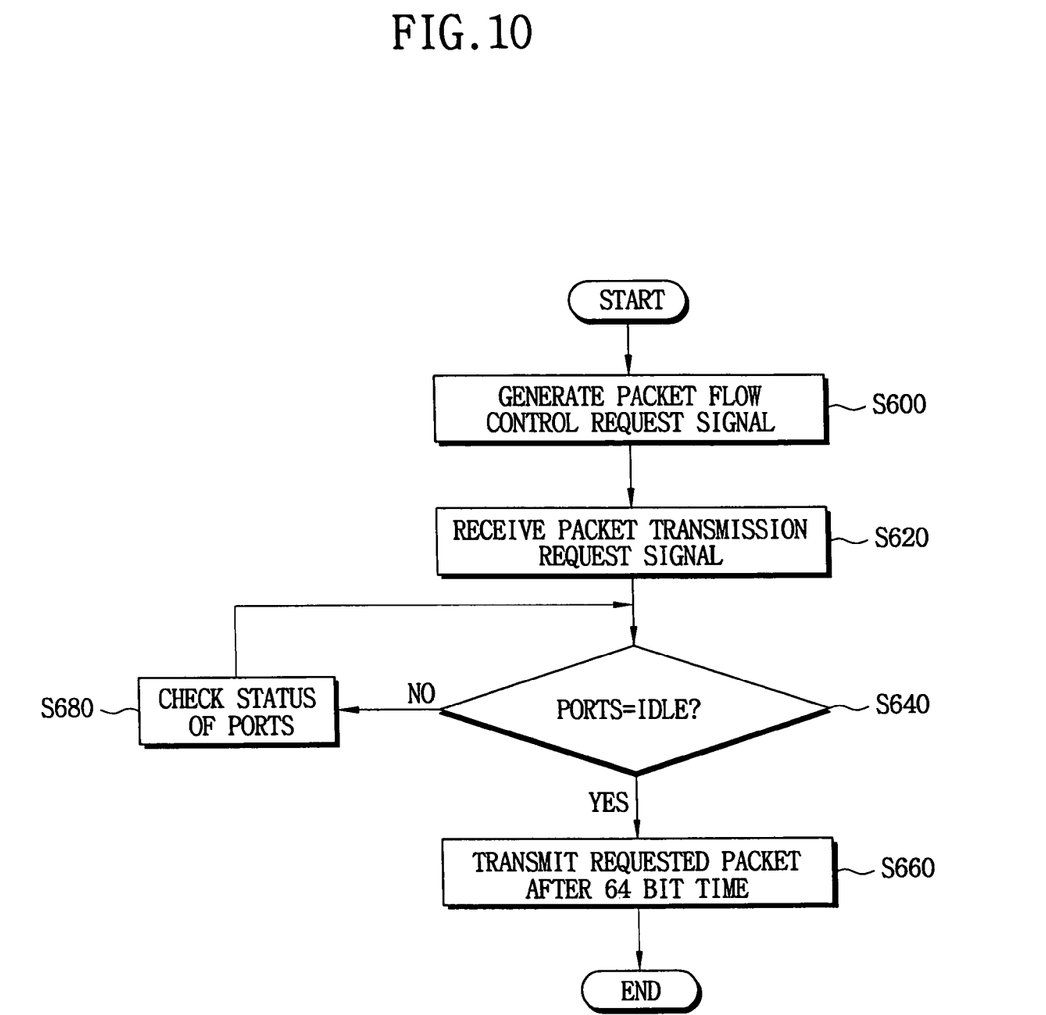
FIG. 10 is a flow chart showing a back pressure flow control of according to another embodiment of the present invention.

FIG. 10 is a flow chart showing a back pressure flow control of according to a third exemplary embodiment of the present invention.

Referring to FIG. 10, when the quantity of the packets stored in the packet memory 50 is larger than the threshold value, the port controllers 10 and 20 generate the packet flow control request signal (step S600).

The MAC devices 70 and 90 check whether the ports to which the packets are transmitted are in the idle status when the MAC devices 70 and 90 receive the packet flow control request signal from the port controllers 10 and 20 (step S640).

When the ports are not in the idle status, the MAC devices 70 and 90 check the status of the ports continuously (step S680).

When the ports are in the idle status, the MAC devices 70 and 90 transmit the requested packet after waiting 64-bits time which is shorter than the IPG time because the back pressure flow control already begins (step S660). When the remote device receives the request packet, the remote device stops transmitting packets.

Figure 11:
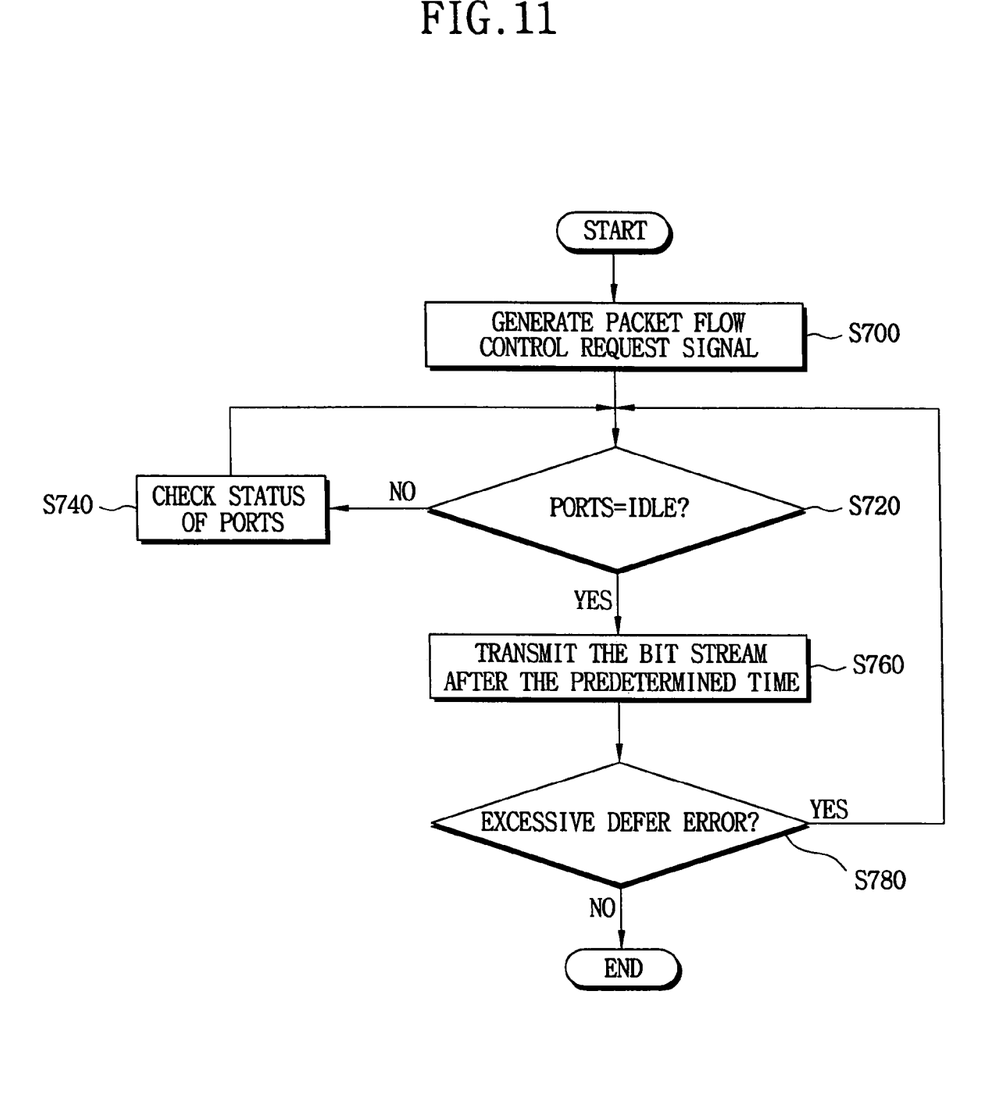
FIG. 11 is a flow chart showing a back pressure flow control of according to another embodiment of the present invention.

FIG. 11 is a flow chart showing a back pressure flow control according to a fourth exemplary embodiment of the present invention.

Referring to FIG. 11, when the quantity of the packets stored in the packet memory 50 is larger than the threshold value, the port controllers 10 and 20 generate the packet flow control request signal (step S700).

The MAC devices 70 and 90 check whether the ports to which the packets are transmitted are in the idle status when the MAC devices 70 and 90 receive the packet flow control request signal (step S720).

When the ports are not in the idle status, the MAC devices 70 and 90 check the status of the ports continuously (step S740).

When the ports are in the idle status, the MAC devices 70 and 90 generate the bit stream and transmit the bit stream to the remote device after waiting a predetermined time period (step S760). For example, the predetermined time period may be shorter than 64-bits time.

In step S780, it is checked whether the time period occupied by the transmission of the bit stream is larger than an excessive latency time. When the time period occupied by the transmission of the bit stream is larger than the excessive latency time, the transmission of the bit stream is stopped and the status of the ports is checked. The excessive latency time is two times larger than the time period corresponding to the maximum packet size. Namely, the excessive latency time is (2×max packet size×8), for example, 24,288 bits time. When the time period occupied by the transmission of the bit stream is larger than the excessive latency time, the remote device discards standby packets that are on the waiting list. The MAC devices 70 and 90 transmit the bit stream before the excessive latency time occurs, and the bit stream is retransmitted after the predetermined time period. For example, the predetermined time period may be from the instance when the idle status of the ports is detected to the instance when 64-bits time is finished. In other word, the bit stream is retransmitted before 64-bits time is finished after the idle status is detected.

Figure 12:
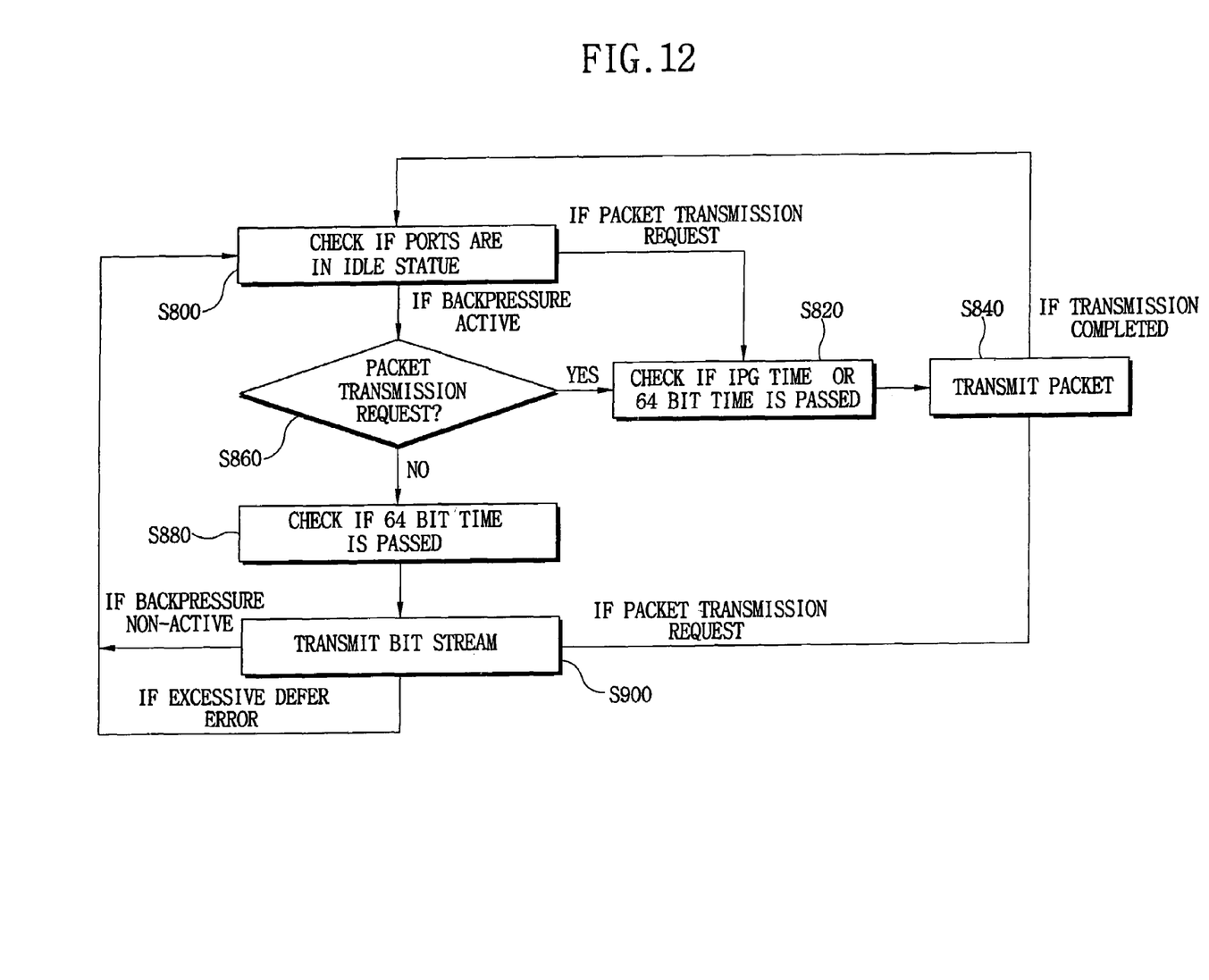
FIG. 12 is a flow chart showing an overall back pressure flow control of according to an embodiment of the present invention.

FIG. 12 is a flow chart showing an overall back pressure flow control according to the present invention.

Referring to FIG. 12, it is checked whether ports are in the idle status (step S800). In case a packet transmission request signal is received from the port controllers 10 and 20 while ports are in the idle status and the back pressure flow control does not yet begin, it is checked whether the IPG time, for example 96 bits time, is passed (step S820), and the packet is transmitted to the remote device (step S840) after the IPG time expires. When the packet transmission is completed, step S800 is repeatedly performed.

It is checked whether the packet transmission request signal is received from the port controllers 10 and 20 while ports are in the idle status and the back pressure flow control begins (step S860). When the packet transmission request signal is received from the port controllers 10 and 20 while ports are in the idle status and the back pressure flow control begins, it is checked whether 64-bits time is passed (step S820), and the requested packet is transmitted to the remote device (step S840). When the packet transmission is completed, step S800 is repeatedly performed.

When the packet transmission request signal is not received from the port controllers 10 and 20 while ports are in the idle status and the back pressure flow control begins, it is checked whether 64-bits time is passed (step S880), and bit stream is transmitted to the remote device (step S900).

In case the packet transmission request signal is received from the port controllers 10 and 20 during the bit stream is transmitted, the transmission of the bit stream is stopped, and the packet is transmitted to the remote device (step S840). When the packet transmission is completed, step S800 is repeatedly performed.

When the time period occupied by the transmission of the bit stream is larger than the excessive latency time while the bit stream is transmitted, the transmission of the bit stream is stopped and the status of the ports is checked. The MAC devices 70 and 90 transmit the bit stream before the excessive latency time occurs, and the bit stream is retransmitted after a predetermined time period. For example, the predetermined time period may be from the instance when the idle status of the ports is detected to the instance when 64-bits time is finished. In other word, the bit stream is retransmitted before 64-bits time is finished after the idle status is detected.

When the back pressure flow control is not active (or the packet flow control request signal is non-active) while the bit stream is transmitted, step S800 is repeatedly performed.

While the exemplary embodiments of the present invention and its advantages have been described in detail, it should be understood that various changes, substitutions and alterations can be made herein without departing from the scope of the invention as defined by appended claims.

What is claimed is:

1. An apparatus for performing a packet flow control in a device for connecting to a plurality of remote devices, said apparatus comprising:
a plurality of port interface devices configured to transmit packets to and receive packets from the remote devices, respectively;
a packet memory configured to store packets from each of the plurality of port interface devices;
a plurality of port controllers configured to generate a packet flow control request signal, which is active when the packet memory is in an overflow condition, and to generate a packet transmission request signal, which is active when a packet stored in the packet memory is to be transmitted to at least one of the remote devices; and
a plurality of media access control (MAC) devices configured to execute a packet flow control operation when the packet flow control request signal generated by the port controllers is active,
wherein the packet flow control operation comprises transmitting a given bit stream to the remote devices via the respective port interface devices, and stopping the transmission of the given bit stream and transmitting the packet from the packet memory when the packet transmission request signal becomes active while the packet flow control request signal is active.

2. The apparatus of claim 1, wherein the apparatus is an Ethernet switch.

3. The apparatus of claim 1, wherein the packet flow control is a back pressure flow control.

4. The apparatus of claim 3, wherein, upon the packet flow control request becoming active, the MAC devices begin execution of the back pressure flow control prior to expiration of an inter-packet gap (IPG) time.

5. The apparatus of claim 4, wherein the MAC devices initiate transmission of the given bit stream when the packet flow control request signal is active and the packet transmission request signal is inactive.

6. The apparatus of claim 5, wherein the MAC devices initiate transmission of the given bit stream a given time period after detecting that the port interface devices are in an idle state, wherein the given time period is a maximum of 64-bits length in duration.

7. The apparatus of claim 6, wherein the MAC devices stop transmitting the given bit stream when a time period during which the MAC devices transmit the given bit stream is longer than an excessive latency time, and then retransmit the given bit stream after waiting a time period of 64-bits.

8. The apparatus of claim 6, wherein, after stopping the transmission of the given bit stream in response to the packet transmission request signal, the MAC devices transmit the packet from the packet memory to the port interface devices.

9. The apparatus of claim 6, wherein, after stopping the transmission of the given bit stream in response to the packet transmission request signal, the MAC devices transmit the packet from the packet memory to the port interface devices after waiting a given time period from a first instance when the MAC devices detect the idle state to a second instance when a time period corresponding to a 64-bits length is finished when the MAC devices receive the packet transmission request signal from the port controllers and the packet flow control request signal is active.

10. The apparatus of claim 1, wherein, when the packet flow control request signal is inactive and the packet request transmission signal is active, the MAC devices initiate transmission of a packet a given time period after detecting that the port interface devices are in an idle state, wherein the given time period is a maximum of 96-bits length in duration.

11. The apparatus of claim 1, further comprising:
a lookup table module configured to receive data contained in packets received from the remote devices via the port controllers to provide lookup table information comprising a source address, a destination address and a MAC address for each of the received packets,
wherein the port controllers respectively include:
a flow control module configured to generate the packet flow control request signal; and
a transceiver module configured to transmit and receive packets, and to receive packet transmission information and packet memory status information, the packet transmission information comprising a source address, a destination address and a MAC address of packets to be transmitted to the remote devices.

12. The apparatus of claim 1, further comprising:
a lookup table module configured to receive data contained in packets received from the remote devices via the port controllers to provide lookup table information comprising a source address, a destination address and a MAC address for each of the received packets; and
a queue manager configured to monitor a status of the packet memory, which generates a packet transmission information based on the lookup table information, and to provide the port controllers with packet transmission information and packet memory status information, packet transmission information comprising a source address, a destination address and a MAC address of packets to be transmitted to the remote devices,
wherein the queue manager includes a queue memory which stores the packet transmission information, and a packet memory manager monitors the status of the packet memory.

13. The apparatus of claim 1, wherein the MAC devices are coupled to the port controllers, respectively.

14. The apparatus of claim 13, wherein each of the MAC devices includes a bit stream module which outputs the given bit stream, a port status detecting module which monitors a status of the port interface devices, and a packet transmitting module which transmits a packet in response to the packet transmission request signal.

15. The apparatus of claim 14, wherein the bit stream module includes:
a bit stream generating module which generates the given bit stream;
a bit stream transmitting module which transmits the given bit stream to the port interface devices; and
a timer for measuring a time period corresponding to a bit length after the idle status is detected.

16. The apparatus of claim 1, wherein each of the port interface devices is connected to a corresponding external port and includes:
a converting module which converts analog signal packets received from the remote devices into digital signal packets, and which converts digital signal packets received from the MAC devices into analog signal packets; and a collision detecting module which detects a packet collision on the external port.

17. The apparatus of claim 16, wherein each of the MAC devices retransmit after waiting a given time period when collision detection module detects the packet collision.

18. The apparatus of claim 17, wherein the given time period is from a first instance when the idle status of the external ports is detected to a second instance when the time period corresponding to a 64-bits length is finished.

19. A method of performing a packet flow control in a device having a packet memory for storing packets, said method comprising:
generating a packet flow control request signal that is active when the packet memory is in an overflow condition, and generating a packet transmission request signal that is active when a packet stored in the packet memory is to be transmitted from the packet memory; and
executing a packet flow control operation in response to the packet flow control request signal becoming active, the packet flow control operation including (a) transmitting a given bit stream after the packet flow control request signal becomes active, (b) and stopping the transmission of the given bit stream and transmitting the stored packet from the packet memory when the packet transmission request signal becomes active while the packet flow control request signal is active.

20. The method of claim 19, wherein the device is an Ethernet switch.

21. The method of claim 19, wherein the packet flow control is a back pressure flow control.

22. The method of claim 21, further comprising:
receiving packets from a remote device;
generating a lookup table information containing a source address, a destination address and an MAC address of the packets received from the remote device; and
generating packet transmission information based on the lookup table information, the packet transmission information having the source address, the destination address and the MAC address of packets that are supposed to be transmitted, the packets being stored in different spaces of the packet memory according to a plurality of ports through which the packets are transmitted.

23. The method of claim 22, wherein said generating the predetermined bit stream generates the predetermined bit stream when the packet flow control request signal is activated and the packet transmission request signal is not activated.

24. The method of claim 23, wherein said transmitting the predetermined bit stream transmits the predetermined bit stream from a first instance when the idle status of the ports is detected to a second instance when the time period corresponding to a 64-bits length is finished when the packet flow control request signal is active and a port through which the bit stream is transmitted is in an idle status.

25. The method of claim 24, further comprising: stopping transmitting the predetermined bit stream when a time period during which the predetermined bit stream is transmitted is longer than an excessive latency time; and retransmitting the predetermined bit stream after waiting the inter-packet gap (IPG) time.

26. The method of claim 24, wherein said transmitting the first packet stops transmitting the predetermined bit stream and transmits the first packet when the packet transmission request signal is activated while the predetermined bit stream is transmitted.

27. The method of claim 21, wherein the back pressure flow control is performed when the port is in an idle status.

28. The method of claim 27, further comprising transmitting the first packet in response to the packet transmission request signal from a first instance when the idle status of the ports is detected to a second instance when the time period corresponding to a 64-bits length is finished when the packet flow control request signal is active.

29. The method of claim 21, further comprising transmitting the first packet before a time period corresponding to a 96-bits length is finished in response to the packet transmission request signal when the packet flow control request signal is inactive and the port is in the idle status.

30. The method of claim 21, wherein the bit stream includes a preamble.

31. The method of claim 21, wherein a length of the bit stream varies based on a time period in which the packet flow control request signal is active.

32. The method of claim 21, further comprising: receiving second packets; transforming signals of the second packets; and detecting whether a packet collision occurs at least one port.

33. The method of claim 32, wherein said transforming the second packets includes: converting analog signals corresponding to the second packets into digital signals corresponding to the second packets when the second packets are provided from said at least one port; and converting digital signals corresponding to the second packets into analog signals corresponding to the second packets when the second packets are provided to said at least one port.

34. The method of claim 32, further comprising: stopping transmitting the predetermined bit stream when the packet collision occurs at said at least one port while the predetermined bit stream is transmitted; and retransmitting the predetermined bit stream in a predetermined period.

35. The method of claim 21, wherein the predetermined period is from a first instance when the idle status of the ports is detected to a second instance when the time period corresponding to a 64-bits length is finished.

* * * * *